(12) United States Patent
Carmel et al.

(10) Patent No.: US 10,146,872 B2
(45) Date of Patent: Dec. 4, 2018

(54) METHOD AND SYSTEM FOR PREDICTING SEARCH RESULTS QUALITY IN VERTICAL RANKING

(71) Applicant: Yahoo! Inc., Sunnyvale, CA (US)

(72) Inventors: David Carmel, Haifa (IL); Ran Wolff, Geva-Carmel (IL)

(73) Assignee: EXCALIBUR IP, LLC, Sunnyvale, CA (US)

( * ) Notice: Subject to any disclaimer, the term of this patent is extended or adjusted under 35 U.S.C. 154(b) by 519 days.

(21) Appl. No.: 14/332,501

(22) Filed: Jul. 16, 2014

(65) Prior Publication Data
US 2016/0019213 A1    Jan. 21, 2016

(51) Int. Cl.
G06F 17/30 (2006.01)

(52) U.S. Cl.
CPC .............. *G06F 17/30864* (2013.01)

(58) Field of Classification Search
CPC .......... G06F 17/30864; G06F 17/3053; G06F 17/30424; G06F 17/30657
See application file for complete search history.

(56) References Cited

U.S. PATENT DOCUMENTS

| | | | | | |
|---|---|---|---|---|---|
| 5,873,076 A | * | 2/1999 | Barr | ............ | G06F 17/30864 704/270.1 |
| 6,651,057 B1 | * | 11/2003 | Jin | ............ | G06F 17/30675 |
| 6,920,448 B2 | * | 7/2005 | Kincaid | ............ | G06F 17/30713 |
| 2003/0195877 A1 | * | 10/2003 | Ford | ............ | G06F 17/30705 |
| 2004/0093328 A1 | * | 5/2004 | Damle | ............ | G06F 17/2785 |
| 2005/0278321 A1 | * | 12/2005 | Vailaya | ............ | G06F 17/30864 |
| 2006/0230035 A1 | * | 10/2006 | Bailey | ............ | G06F 17/3064 |
| 2007/0061317 A1 | * | 3/2007 | Ramer | ............ | G06F 17/3064 |
| 2007/0073748 A1 | * | 3/2007 | Barney | ............ | G06F 17/30675 |
| 2007/0192300 A1 | * | 8/2007 | Reuther | ............ | G06F 17/30427 |
| 2007/0239702 A1 | * | 10/2007 | Vassilvitskii | ............ | G06F 17/30864 |
| 2009/0006382 A1 | * | 1/2009 | Tunkelang | ............ | G06F 17/30424 |
| 2009/0037401 A1 | * | 2/2009 | Li | ............ | G06F 17/30675 |
| 2009/0171867 A1 | * | 7/2009 | Bilenko | ............ | G06F 17/30619 706/12 |
| 2010/0042589 A1 | * | 2/2010 | Smyros | ............ | G06F 17/30616 707/710 |

(Continued)

OTHER PUBLICATIONS

Jie Luo, et al., A Unified Search Federation System Based on Online User Feedback, Proceedings of the 19th ACM SIGKDD, Aug. 11-14, 2013.

(Continued)

*Primary Examiner* — Shiow-Jy Fan
(74) *Attorney, Agent, or Firm* — Pillsbury Winthrop Shaw Pittman LLP

(57) ABSTRACT

Methods, systems and programming for predicting search results quality. In one example, a search query is received from a user. A plurality of search results are obtained from a content source based on the search query. The plurality of search results are ranked based on their relevance scores with respect to the search query. A distribution of the relevance scores of the plurality of search results is normalized in each position of the ranking. A metric of the content source is computed based on the normalized distribution of the relevance scores. The metric indicates a relevance between the plurality of search results and the search query.

15 Claims, 17 Drawing Sheets

(56) References Cited

U.S. PATENT DOCUMENTS

2012/0278321 A1* 11/2012 Traub ............... G06F 17/30657
  707/736

OTHER PUBLICATIONS

David Carmel, et al., Estimating the Query Difficulty for Information Retrieval. Synthesis Lectures on Information Concepts, Retrieval, and Services, 2010.
Jaime Arguello, et al. Sources of evidence for vertical selection, SIGIR, Jul. 19-23, 2009.

* cited by examiner

| Relevance Score | Query 1 | Query 2 | Query 3 | ... | Mean | SD |
|---|---|---|---|---|---|---|
| Search Result Position 1 | 2.37 | 1.25 | 1.39 | ... | avg(1) | sigma(1) |
| Search Result Position 2 | 1.56 | 1.12 | 1.19 | ... | avg(2) | sigma(2) |
| Search Result Position 3 | 0.98 | 0.36 | 1.01 | ... | avg(3) | sigma(3) |
| ... | ... | ... | ... | ... | ... | ... |
| Search Result Position n | 0.45 | 0.16 | 0.78 | ... | avg(n) | sigma(n) |

Fig. 4

METHOD AND SYSTEM FOR PREDICTING SEARCH RESULTS QUALITY IN VERTICAL RANKING

BACKGROUND

1. Technical Field

The present teaching relates to methods, systems, and programming for vertical search. Particularly, the present teaching relates to methods, systems, and programming for predicting search results quality in vertical ranking.

2. Discussion of Technical Background

Vertical search attempts to achieve diversity by presenting search results from different content sources, so-called verticals (e.g., shopping, local, news, finance, etc.), in addition to the standard web results. Vertical search has two main components: (1) pre-retrieval vertical selection, concerned with how to select the verticals from which relevant items can be retrieved, and (2) post-retrieval vertical ranking which ranks the verticals based on the predicted quality of their search results. Such a ranking can be used for selecting which vertical results to present on the search results page and for setting the order of presentation. Post-retrieval vertical ranking, is an important step for vertical search, in particular for projects for which only one or a few vertical results are exposed to the user. The ability to select the most appropriate vertical results for the user has a tremendous effect on the search performance, thus, any improvement in this direction can result in high impact, from business as well as academic points of views.

Existing solutions for post-retrieval vertical ranking are based on learning a ranking function from the user feedback. Any user clicks on a specific vertical presented on the search results page can be interpreted as the user preferring the results of this vertical over the results of preceding presented verticals. These preferences are given as input to a learning-to-rank system which generalizes them to a vertical ranking function. One disadvantage of this approach is that it depends on existing user feedback which might not exist during system launch time. Additionally, the relevance of the vertical results to the query is not fully analyzed by these approaches; only the preferences between vertical results are considered. While the learning, system may consider some features of the vertical results as input to the ranking function, it is not clear whether the user preferences are inferred from the relevance of the vertical search results to the query, or from other reasons such as the presentation bias, from user personal biases, or from other latent reasons.

On the other hand, query performance prediction (QPP) method, such as normalized query commitment (NIX) and weighted information gain (WIG) approaches, is an emerging technology in information retrieval that attempts to predict the relevance of the search results to the user query. Both NQC and WIG use query-based normalization techniques that eliminate query dependent features such as the query length. However, their contribution fir distributed search was found to be marginal because the QPP prediction methods cannot be compared directly across content sources (e.g., verticals, content providers, etc.). Prediction values can be used to compare the quality of search results retrieved by the same vertical for different queries; however, they cannot be used to effectively compare the quality of search results retrieved by different verticals for the same query.

Therefore, there is a need to provide an improved solution for post-retrieval vertical ranking to solve the above-mentioned problems.

SUMMARY

The present teaching relates to methods, systems, and programming for vertical search. Particularly, the present teaching relates to methods, systems, and programming for predicting search results quality in vertical ranking.

In one example, a method, implemented on at least one machine each having, at least one processor, storage, and a communication platform connected to a network for predicting search results quality is presented. A search query is received from a user. A plurality of search results are obtained from a content source based on the search query. The plurality of search results are ranked based on their relevance scores with respect to the search query. A distribution of the relevance scores of the plurality of search results is normalized in each position of the ranking. A metric of the content source is computed based on the normalized distribution of the relevance scores. The metric indicates a relevance between the plurality of search results and the search query.

In a different example, a system having at least one processor, storage, and a communication platform connected to a network for predicting search results quality is presented. The system includes a search engine, a normalization module, and a ranking module. The search engine is configured to receive a search query from a user and obtain a plurality of search results from a content source based on the search query. The plurality of search results are ranked based on their relevance scores with respect to the search query. The normalization module is configured to normalize a distribution of the relevance scores of the plurality of search results in each position of the ranking. The ranking module is configured to compute a metric of the content source based on the normalized distribution of the relevance scores. The metric indicates a relevance between the plurality of search results and the search query.

Other concepts relate to software for predicting search results quality. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for predicting search results quality is presented. The recorded information, when read by the machine, causes the machine to perform a series of processes. A search query is received from a user. A plurality of search results are obtained from a content source based on the search query. The plurality of search results are ranked based on their relevance scores with respect to the search query. A distribution of the relevance scores of the plurality of search results is normalized in each position of the ranking. A metric of the content source is computed based on the normalized distribution of the relevance scores. The metric indicates a relevance between the plurality of search results and the search query.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 depicts an exemplary sample-based normalization of relevance scores of search results, according to an embodiment of the present teaching;

DETAILED DESCRIPTION

Figure 1:
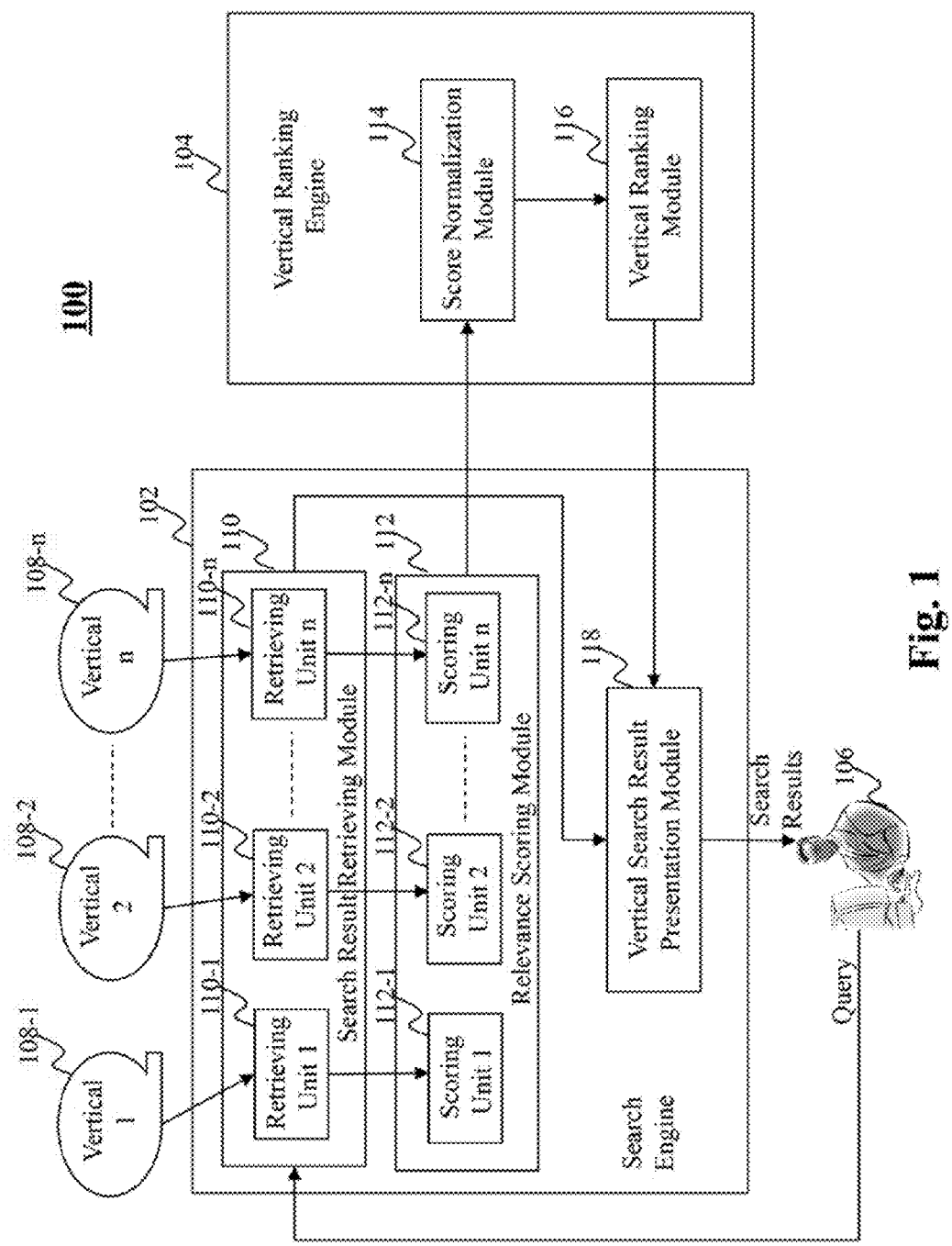
FIG. 1 is an exemplary system diagram of a system for vertical ranking in vertical search, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching describes methods, systems, and programming aspects of search results quality prediction for vertical ranking in vertical search. The methods and systems in the present teaching implement novel normalization schemes of search results relevance score distributions, retrieved by several verticals for the same query, for supporting an effective and efficient comparison of results quality in the same scale across verticals using performance prediction methods that are based on score distribution analysis. The normalization schemes in the present teaching are based on normalizing the score distribution of each vertical at each position. The methods and systems in the present teaching do not require existing user feedback and thus, can be applied in system launch time. In addition, normalized QPP scores can be easily integrated into the learning-to-rank component as core features of the vertical search results. As normalized QPP scores better differentiate between different vertical results, they are likely be more effective to be used by the learner compared to non-normalized QPP scores.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is an exemplary system diagram of a system for vertical ranking in vertical search, according to an embodiment of the present teaching. The system 100 may implement various normalization schemes across verticals to improve vertical ranking in vertical search based on predication of the verticals' search results quality. The system 100 in this embodiment includes a search engine 102 and a vertical ranking engine 104. Search queries are received from users 106 and used for retrieving multiple sets of search results from different verticals 108-1, 108-2, . . . 108-n. Each vertical 108-1, 108-2, . . . , 108-n may be a vertical content source from the same or different content providers based on topicality, media type, or genre of content. Exemplary verticals include, for example, local information, shopping, the automotive industry, legal information, medical information, scholarly literature, travel, etc.

The search engine 102 in this embodiment includes a search result retrieving module 110, which has multiple retrieving units 110-1, 110-2, ... 110-n. Each retrieving unit 110-1, 110-2, ... 110-n is responsible for retrieving search results front a corresponding vertical 108-1, 108-2, ... 108-n based on the query received from the user 106. For example, each retrieving unit 110-1, 110-2, ... 110-n may use a focused crawler that attempts to index only web pages that are relevant to a pre-defined topic or set of topics (i.e., a vertical). The search engine 102 in this embodiment also includes a relevance scoring module 112, which has multiple scoring units 112-1, 112-2, ... 112-n. Each scoring unit 112-1, 112-2, ... 112-n implements a scoring function different from other scoring units in this embodiment. Each vertical 108-1, 108-2, ... 108-n may have a unique scoring function for providing relevance scores of the search results retrieved by the corresponding retrieving unit 110-1, 110-2, ... 110-n. A relevance score may indicate the level of relevance between a search result and the query. In this embodiment, search results in the search index retrieved by each retrieving unit 110-1, 110-2, ... 110-n are ranked by their relevance scores, and each scoring unit 112-1, 112-2, ... 112-n outputs a distribution of relevance scores of the top n search results. Any suitable relevance scoring functions as known in the art may be implemented by the relevance scoring module 112.

The vertical ranking, engine 104 in this embodiment is responsible for ranking the verticals 108-1, 108-2, ... 108-n based on normalized relevance score distributions of search results retrieved from the respective vertical 108-1, 108-2, ... 108-n. The vertical ranking engine 104 may compute a metric, e.g., a QPP score, for each vertical. 108-1, 108-2, ... 108-n based on the normalized distribution of the relevance scores. The value of the metric predicts the overall level of relevance between the search results from the vertical and the query. The vertical ranking engine 104 in this embodiment includes a score normalization module 114 and a vertical ranking module 116. The score normalization module 114 receives a distribution of relevance scores of the ranked search results of a vertical 108-1, 108-2, ... 108-n from the corresponding scoring unit 112-1, 112-2, ... 112-n and then normalizes the relevance score distribution in each position of the search results ranking. The normalization schemes applied by the score normalization module 114 include, for example, a sample-based normalization schemes and an order statistics-based normalization scheme, which are described in detail below. The vertical ranking module 116 then predicts the query performance in the vertical by computing a metric based on the normalized relevance score distribution provided by the score normalization module 114. The prediction may be based on any suitable QPP methods as known in the art, such as NQC and WIG. Based on the values of metric for each vertical 108-1, 108-2, ... 108-n with respect to the same query from the user 106, the vertical ranking module 116 ranks all the verticals 108-1, 108-2, ... 108-n and/or selects one or more top-ranked verticals.

The search engine 102 in this embodiment further includes a vertical search result presentation module 118, which presents search results from some of the verticals 108-1, 108-2, ... 108-n (e.g., the top ranked verticals selected by the vertical ranking module 116). Search results from the same vertical may be grouped together and labeled with the vertical indication (e.g., local results, news results, etc.) on the search results page. The presentation order of the search results on the page may be associated with the ranking of the corresponding verticals. In some embodiments, if only one vertical is allowed for providing search results, then the highest ranked vertical is determined, and the search results from the highest ranked vertical are presented to the user 106.

Figure 2:
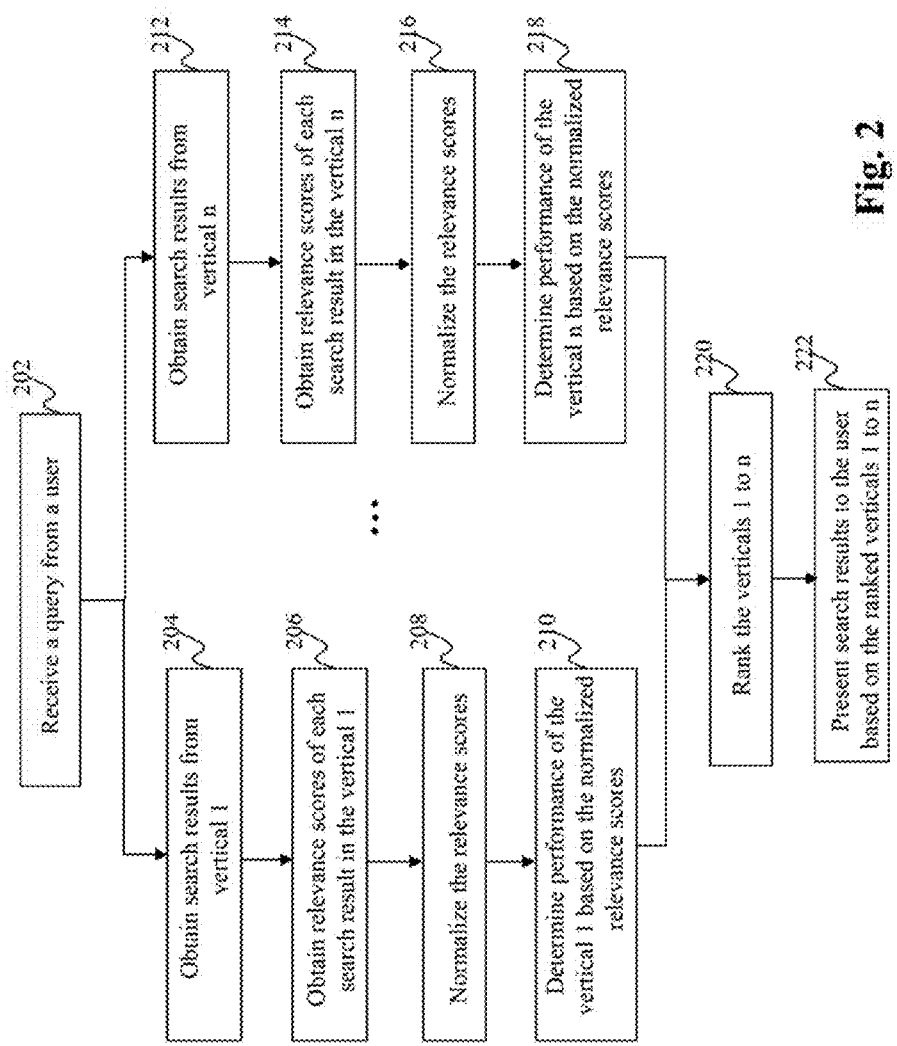
FIG. 2 is a flowchart of an exemplary process for vertical ranking based on vertical search results quality prediction, according to an embodiment of the present teaching.

FIG. 2 is a flowchart of an exemplary process for vertical ranking based on vertical search results quality prediction, according to an embodiment of the present teaching. Starting at 202, a query is received from a user. The receiving of the query in this embodiment invokes vertical searches performed in multiple vertical content sources in parallel. Pre-retrieval vertical selection may be made to determine the verticals from which relevant content items can be retrieved. At 204, search results are obtained from the first vertical. At 206, relevance scores of each search result retrieved from the first vertical with respect to the query are obtained, for example, based on a scoring function. In this embodiment, the search results are ranked based their relevance scores. At 208, the relevance scores of the search results in the first vertical with respect to the query are normalized, in this embodiment, the distribution of the relevance scores in each position of the ranking is normalized using a sample-based normalization scheme or an order statistics-based normalization scheme, as described below in detail. At 210, the query performance of the first vertical is determined based on the normalized relevance scores. In this embodiment, the normalized relevance scores are used by any suitable QPP methods, such as NQC or WIG, to predict the search results quality of the first vertical based on a normalized QPP score.

The similar process (204 to 210) is applied to each of the selected verticals in parallel. For example, through 212 to 218, the query performance of the nth vertical with respect to the same query is determined based on the normalized relevance scores of the search results from the nth vertical. Once the performance of each vertical is predicted, the verticals are ranked at 220 based on their performance. At 222, the search results are presented to the user based on the ranked verticals as the response to the query. In this embodiment, the ranking of the verticals is used for selecting which vertical results to present on the search results page and/or for setting, the order of presentation.

Figure 3:
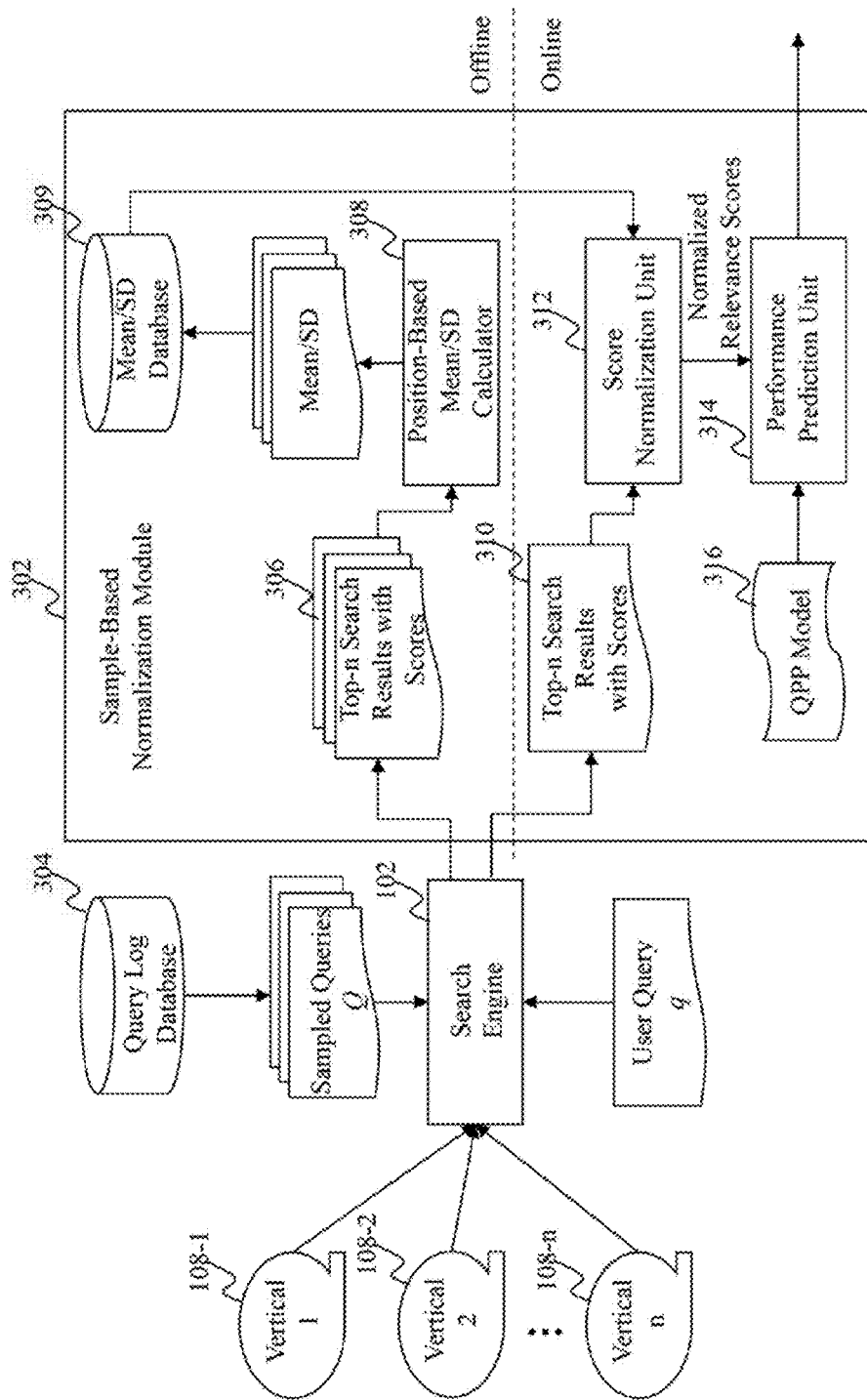
FIG. 3 is an exemplary system diagram of a score normalization module in the system of FIG. 1, according to an embodiment of the present teaching.

FIG. 3 is an exemplary system diagram of a score normalization module in the system of FIG. 1, according to an embodiment of the present teaching. In this embodiment, a sample-based normalization scheme is implemented by a sample-based normalization module 302, which is the first application embodiment of the score normalization module 114 in FIG. 1. In this embodiment, a query log database 304 stores sample queries collected b the search engine 102 based on historical search queries from general user population. A set of sample queries Q can effectively represent the queries expected to be served by the search engine 102, such as a large random sample from the query log database 304. In this embodiment, a preprocessing process is performed offline by the search engine 102 in conjunction with the sample-based normalization module 302. For each of the verticals 108-1, 108-2, ... 108-n, the search engine 102 performs vertical search based on each of the sample queries Q and obtains the top n search results 306 with relevance scores from the respective vertical n may be any arbitrary number, for example, 100. Each of the top a search results 306 with its relevance score is thus associated with a position i ($1<=i<=n$) in the ranking.

In this embodiment, the sample-based normalization module 302 includes a position-based mean/standard deviation (SD) calculator 308 for calculating normalization factors (e.g., average score avg_v(i) and its SD sigma_v(i)) in each position i for a vertical v. For each vertical 108-1, 108-2, ... 108-n, the calculated values of mean and SD at each position i of the top n search results 305 are stored in the mean/SD database 309. In this embodiment, the above-mentioned preprocessing process for obtaining mean and SD at each position is performed offline. Referring now to FIG. 4, vertical search is performed based on each of a plurality of sample queries (query 1, query 2, query 3, . . . ) in the same vertical. As shown in FIG. 4, each column represents the top a relevance scores of the search results with respect to a corresponding query. The relevance scores are sorted in a decreasing order, where position 1 has the highest relevance score and position a has the lowest one. Similarly, the top a relevance scores of search results with respect to each sample query are obtained and sorted at each position from 1 to n. The values of mean avg(i) and SD sigma(i) of the relevance scores with respect to different sample queries are calculated at each position 1.

Referring back to FIG. 3, at run time, once a user query q is received by the search engine 102 which invokes vertical search in each vertical 108-1, 108-2, . . . 108-n, the search engine 102 obtains top n search results 310 with relevance scores with respect to the new user query q from the respective vertical. Different from the top it search results 306, which are retrieved offline based on sample queries Q using the preprocessing process, the top n search results 310 are retrieved online based on the new user query q. The top it search results 310 are also ranked based on their relevance scores, and each of the top n search results 310 with its relevance score is thus associated with a position i in the ranking as well. In this embodiment, the sample-based normalization module 302 includes a score normalization unit 312 configured to in each position i of the ranking, compute a normalized relevance score of the respective search result based on the mean and SD of relevance scores in the position i.

In one example, for each vertical v with the top n search results and relevance scores s_v(1), . . . s_v(n) with respect to the user query q, the score normalization unit 312 normalizes the search result scores s by:

$$z\_v(i)=(s\_v(i)-\text{avg}\_v(i))/\text{sigma}\_v(i) \quad (1),$$

where z_v(i) is the normalized relevance score at position for vertical v with respect to the user query q. A distribution of the normalized relevance scores (z-scores) of the vertical r with respect to the user query q is obtained by applying Equation (1) at each position from i=1 to i=n.

In this embodiment, the sample-based normalization module 302 may also include a performance prediction unit 314 responsible for calculating a QPP score of a vertical v with respect to the user query q based on the distribution of the normalized relevance scores (z-scores) using a QPP model 316. The QPP model 316 may be, for example, NQC, WIG, or any other suitable QPP models as known in the art. In this embodiment, the value of the NQC or WIG score is calculated based on the normalized relevance scores (z-scores) for each vertical 108-1, 108-2, . . . 108-n, which may be used by the vertical ranking module 116 for ranking the verticals 108-1, 108-2, . . . 108-n with respect to the user query q in a decreasing order. In other words, the QPP score calculated based on the distribution of normalized relevance scores is an indication of vertical search results quality of the corresponding vertical e.g., the overall relevance between the search results in a vertical and the search query).

Figure 5:
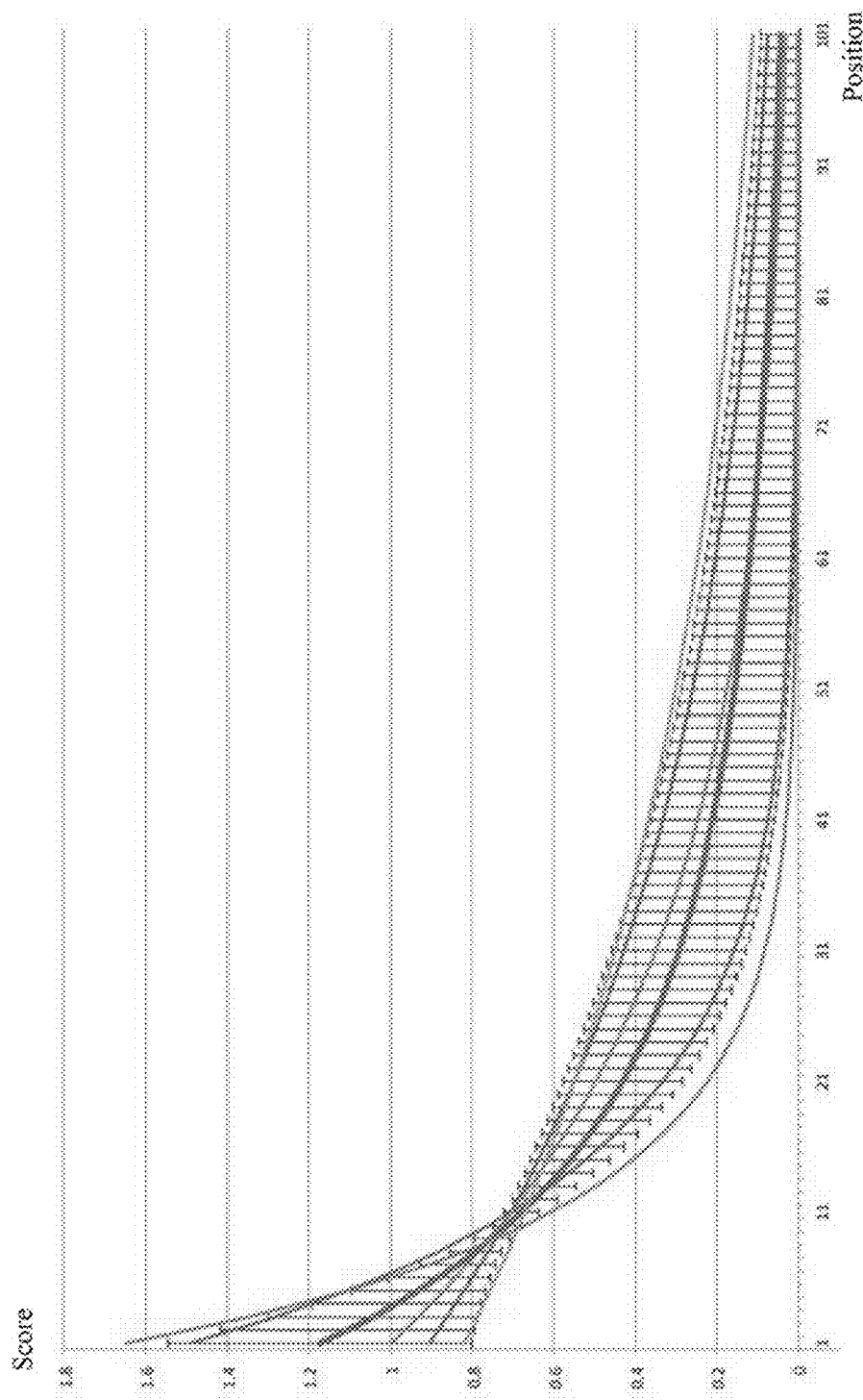
FIG. 5 depicts exemplary plots of relevance score distributions of several queries as retrieved by a vertical.

FIG. 5 depicts exemplary plots of relevance score distributions of several queries as retrieved by a vertical. FIG. 5 shows typical relevance score distributions of several sample queries in a set of sample queries Q as retrieved by a specific vertical, and the average plot of these distributions. The y-axis represents values of the relevance scores of search results from the vertical, and the x-axis represents the positions of the search results in the ranking. The average distribution may be used to normalize the relevance scores of any query during the run-time thus bringing all query-search result relevance scores to the same scale. In one example, not all the relevance scores are considered for predicting vertical search performance, e.g., only relevance scores that are in the positions from 1 to 10 (i<=10) in FIG. 5 are normalized and used for calculating QPP scores. As the relevance scores are normalized for all selected verticals, QPP scores of the same query over different verticals can thus be compared. It is note that normalization is done by the same set of sample queries Q for all verticals to be compared.

Figure 6:
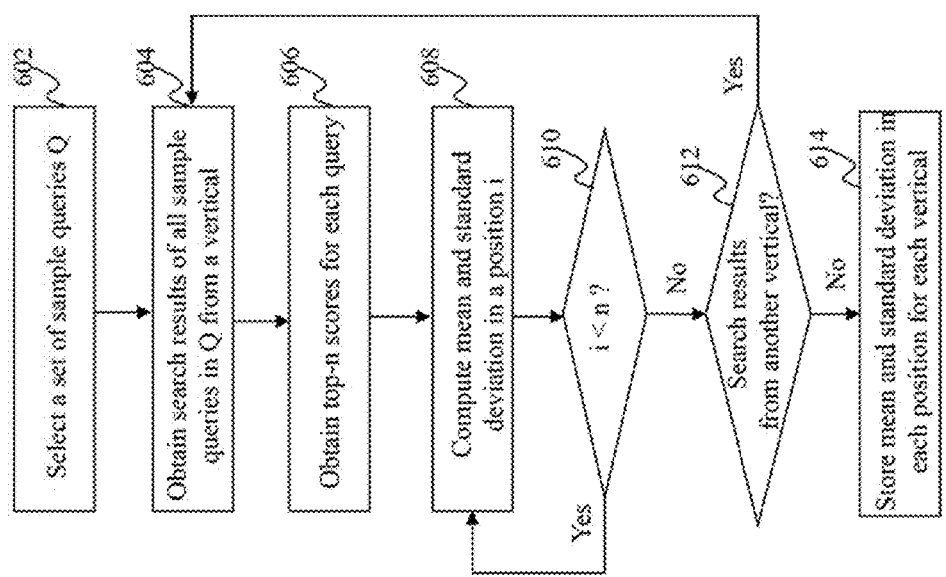
FIG. 6 is a flowchart of an exemplary process for sample-based normalization of relevance scores of search results, according to an embodiment of the present teaching.

FIG. 6 is a flowchart of an exemplary process for sample-based normalization of relevance scores of search results, according to an embodiment of the present teaching. In this embodiment, an offline preprocessing process for generating mean and SD in each position for each vertical is described. Starting at 602, a set of sample queues are selected. The set of sample queries may effectively represent the queries expected to be served by the vertical search, such as a large random sample from the query log of the vertical search system. At 604, search results of all sample queries are obtained from the first selected vertical. The search results are ranked based on their relevance scores. At 606, the top n relevance scores are obtained for each sample query (e.g., n=100). At 608, for a position i, the average score and its SD are computed. The calculation at 608 is repeated for each position until i reaches n (checked at 610, where 1<=i<=n). At 612, the process checks whether there is another vertical selected for vertical search. If the answer is "yes," the process is repeated from 604, where search results of all sample queries from the second selected vertical are obtained, and all the way goes to 612 until all the selected verticals are preprocessed. At 614, the mean and SD values in each position for each of the selected verticals are stored as normalization factors for future use.

Figure 7:
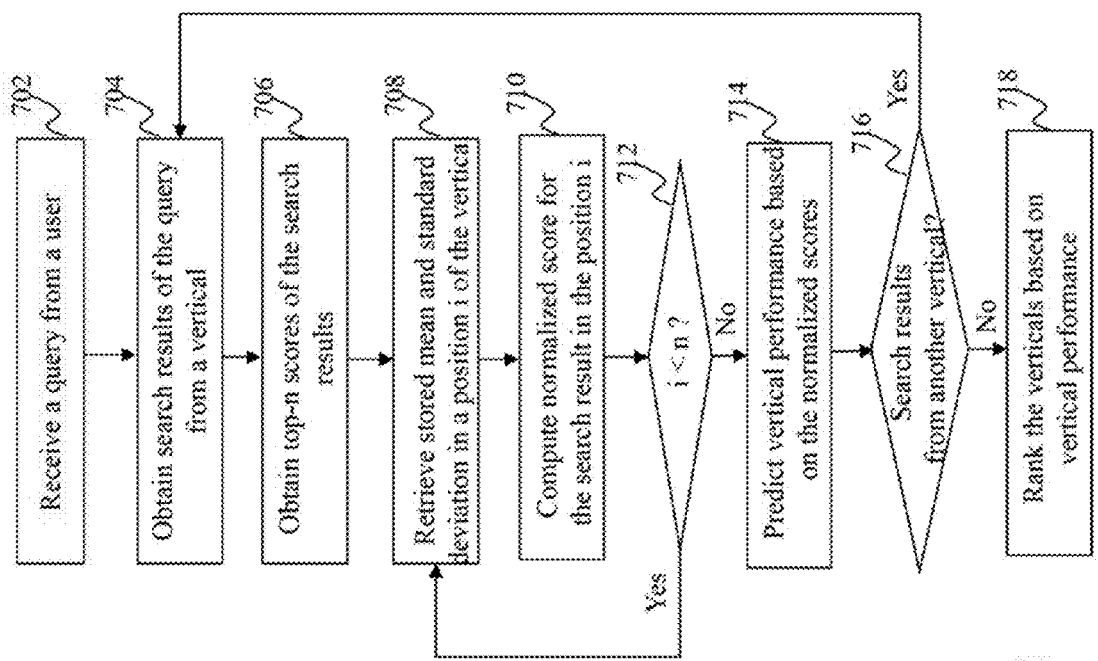
FIG. 7 is a flowchart of an exemplary process far vertical ranking based on sample-based normalization of relevance scores, according to an embodiment of the present teaching.

FIG. 7 is a flowchart of an exemplary process for vertical ranking based on sample-based normalization of relevance scores, according to an embodiment of the present teaching. In this embodiment, an online vertical ranking process is triggered by receiving an actual user query at 702. At 704, search results of the actual user query are obtained from the first selected vertical. The search results are ranked based on their relevance scores with respect to the actual user query. At 706, the top is relevance scores are obtained for the user query (e.g., n=100). In this embodiment, n is the same as in the offline preprocessing in FIG. 6. At 708, for a position i, the stored mean and SD of relevance scores in the position i are retrieved. The mean and SD are obtained for the same first vertical by the offline preprocessing process in FIG. 6. At 710, normalized relevance score in the position i is computed based on the mean and SD in this position. For example, the calculation may use Equation (1) above. The retrieving and calculation at 708 and 710 are repeated for each position until i reaches n (checked at 712, where 1<=i<=n). At 714, vertical performance of the first vertical is predicted based on the normalized relevance score distribution from position 1 to position n. For example, NQC or WIG value may be calculated based on the normalized relevance scores. At 716, the process checks whether there is another vertical selected for vertical search. If the answer is "yes," the process is repeated from 704, where search results of the actual user query from the second selected vertical are obtained, and all the way goes to 714 until performance of all the selected verticals are predicted. Based on the performance, the selected verticals are ranked at 718.

Figure 8:
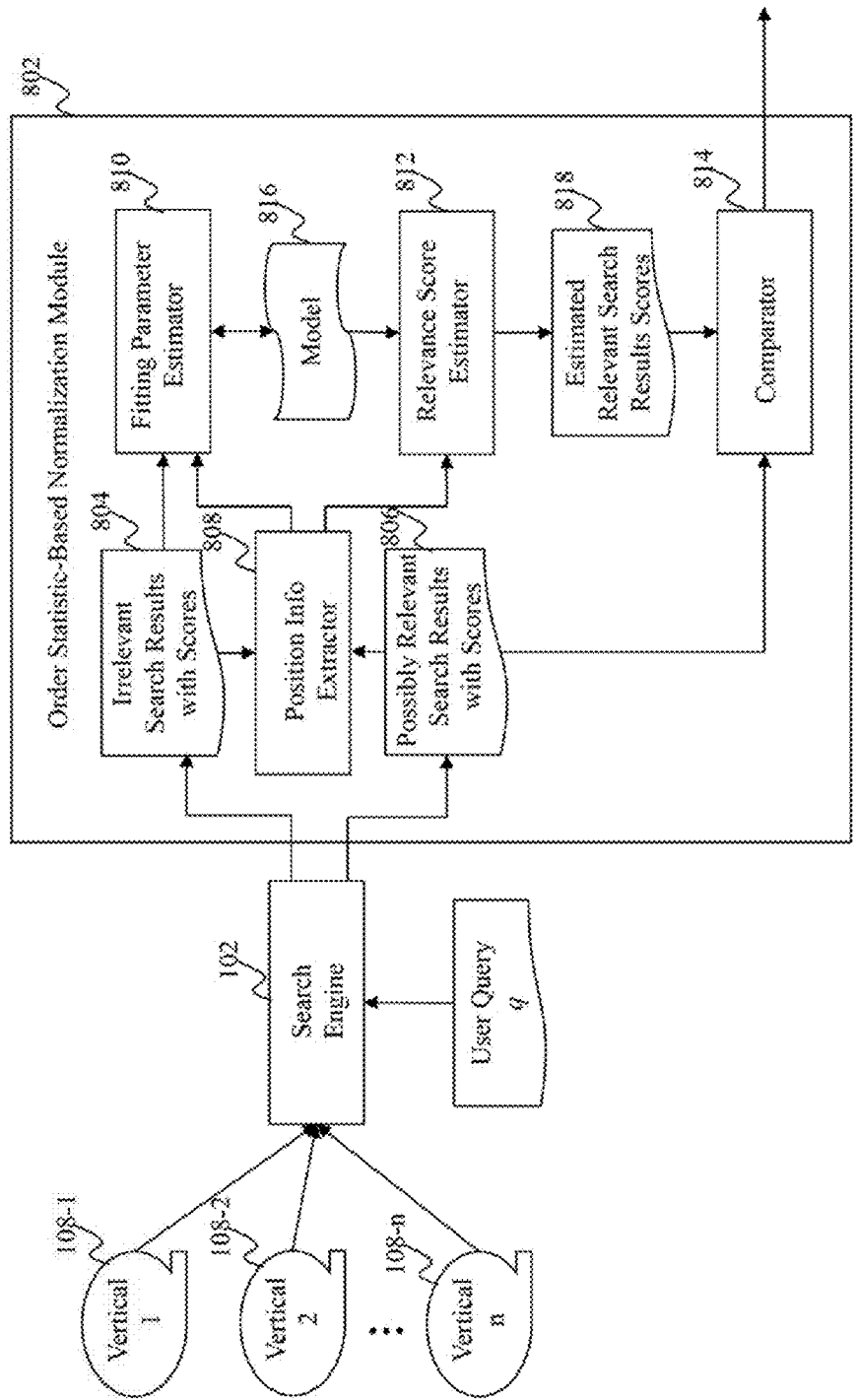
FIG. 8 is an exemplary system diagram of another score normalization module in the system of FIG. 1, according to an embodiment of the present teaching.

FIG. 8 is an exemplary system diagram of another score normalization module in the system of FIG. 1, according to an embodiment of the present teaching. In this embodiment, an order statistics-based normalization scheme is implemented by an order statistics-based normalization module 802, which is the second application embodiment of the score normalization module 114 in FIG. 1. The second application embodiment does not rely on preprocessing, but rather on the theory of order-statistics.

Given a user query q, the relevance scores SE(q) of search results retrieved by the search engine 102 from a vertical v may be considered as sample of the search engine's 102 scoring function S(d|q). S(d|q) is a general scoring function defined over all the content space, while the search index of a vertical contains only a subset of this space. Thus, SE(q) can be considered as a random sample of the scoring function in a vertical, which are approximated by a certain distribution, SE(q) may be a large sample of relevance scores for all content items in the search index of the vertical that match the user query. Based on order statistics, the distribution of the top relevance scores for the user query at each position in the ranking can be modeled. Assume that |SE(q)|=n content items match the query (top n search results). $S_{\{i:n\}}(d|q)$ is denoted as the relevance score for a search result d at position i, where i=1 is the lowest score out of n and i=n is the highest. Order statistics postulates the expectation of this distribution as:

$$E[S_{\{i:n\}}(d|q)] = F^{\{-1\}}((i/(n+1))) \quad (2),$$

where F( ) is the cumulative distribution function (CDF) of S(d|q), and F{−1}( ) is its inverse function. For convenience, denote position p=n−i, Equation (2) now becomes:

$$E[S_{\{p:n\}}(d|q)] = F^{\{-1\}}((n-p)/(n+1)) \quad (3)$$

Equation (3) with p=0 (for the top score) through p=n−1 represents the position p in the ranking of the search results. It is widely assumed that the distribution of search results relevance scores given by a typical search engine 102 can be approximated by a mixture of a first distribution (e.g., a normal distribution) for irrelevant search results and a second distribution (e.g., a gamma distribution) for possibly relevant search results. Assuming that all top search results are irrelevant and their relevance scores are random, hence S(d|q) can be approximated by a certain distribution, e.g., a normal distribution, for irrelevant search results. The CDF of S(d|q) can be approximated and used to model the expectation $E[S_{\{p:n\}}]$ in Equation (3) as a function of the position information (n−p)/(n+1) with certain fitting parameter(s). The fitting, parameter(s) may be estimated based on the user query's top relevance scores. When the actual relevance scores of the top ranked search results (possibly relevant search results) are considerably higher than their score expectations (estimated relevance scores based on the expectation $E[S_{\{p:n\}}]$), the irrelevance hypothesis that these scores are random and derived from the certain distribution can be rejected. Thus, the magnitude of deviation may be used as a prediction to the existence of relevant search results in the top results list.

Figure 9:
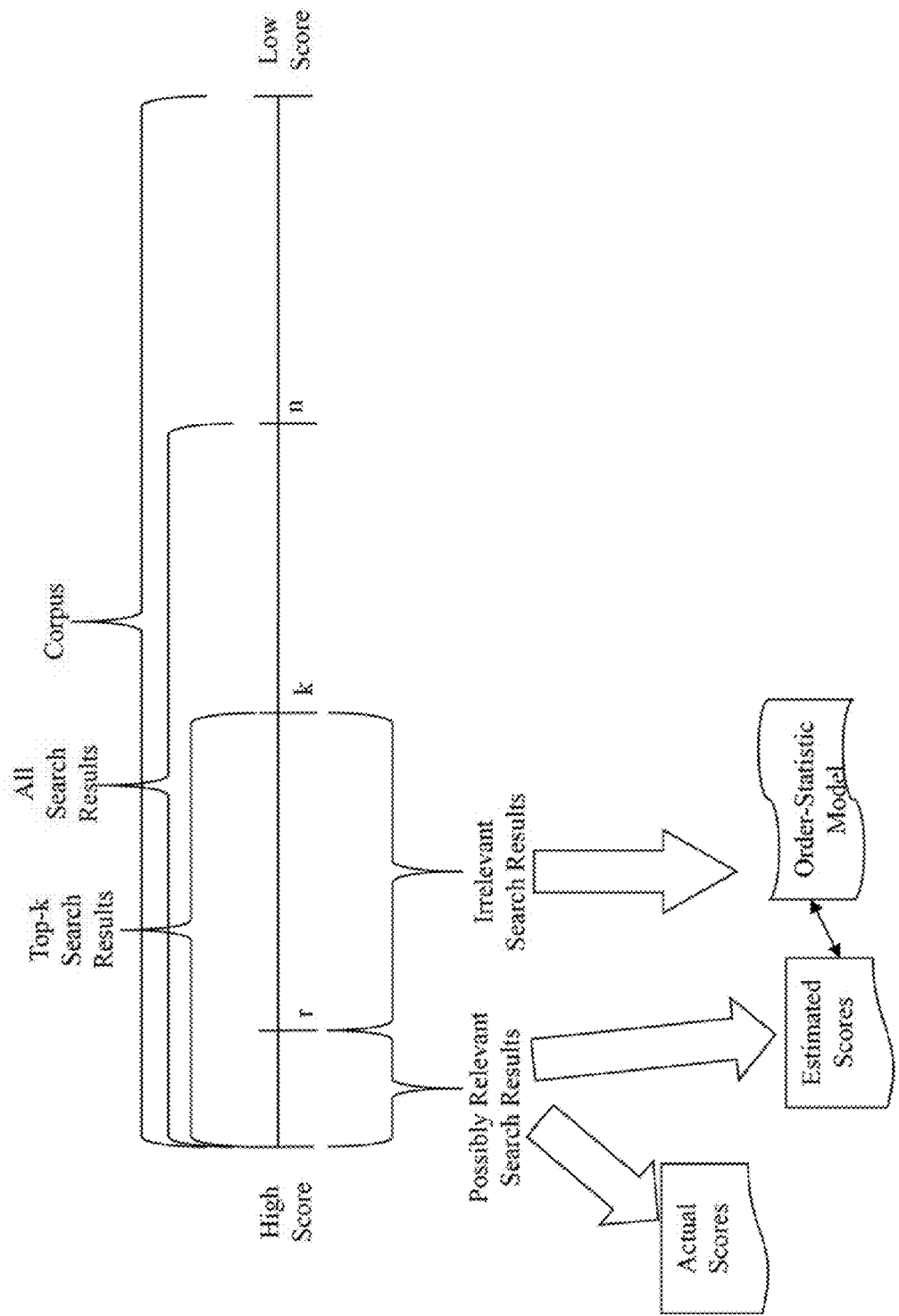
FIG. 9 depicts an exemplary order statistics-based normalization of relevance scores of search results, according to an embodiment of the present teaching.

Referring now to FIG. 9, in a vertical having a content corpus tall content items), a search against a query is performed. From all the content items in the corpus, n content items, each of which has a non-zero relevance score, are retrieved as the search results of the query. All the n search results are ranked based on their relevance scores from high to low, where the highest relevance score is in position 0 and the lowest relevance score is in position n−1. In this embodiment, only the top k search results in the ranking are taken into consideration. The top k search results are divided into two sets: possibly relevant search results set, and irrelevant search results set. The possibly relevant search results have higher relevance scores than the irrelevant search results. In this embodiment, the possibly relevant search results set includes search results from position 0 to r (0<p<r), and the irrelevant search results set includes search results from position r+1 to k (r<p<k). As described above, assuming the search results relevance scores in the irrelevant search results set are random and are approximated by a certain distribution, an order-statistics model can be built based on the CDF of the certain distribution and the obtained relevance scores with respect to their positions p in the ranking. The order-statistics model can be used to estimate score expectations of the search results in the possibly relevant search results set with the assumption that their relevance scores are random and also approximated by the same certain distribution. On the other hand, the actual relevance scores of the search results in the possibly relevant search results set are compared with the estimated relevance scores, and the magnitude of difference, e.g., deviation, is used as a metric indicating the overall relevance of the search results in the vertical (i.e., vertical search performance of the vertical).

Referring back to FIG. 8, in response to receiving the user query q, the search engine 102 obtains n search results with non-zero relevance scores from each vertical 108-1, 108-2, . . . 108-*n*. The search results are ranked based on their relevance scores. At least some of the search results (e.g., the top k search results in the ranking) are divided into two sets based on their positions p in the ranking: irrelevant search results set 804 and possibly relevant search results set 806. The order statistics-based normalization module 802 in this embodiment includes a position information extractor 808, a fitting parameter estimator 810, a relevance score estimator 812, and a comparator 814. The position information extractor 808 extracts the position p for each search result and provide them along with the total number of search results II to the fitting parameter estimator 810 for model parameter fitting and also to the relevance score estimator 812 for score expectation estimation. The fitting parameter estimator 840 is responsible for estimating fitting parameter(s) in the order-statistics model 816 based on the obtained relevance scores of search results in the irrelevant search results set 804 and the position information p, n. In one example, assuming that the relevance scores of search results in the irrelevant search results set 804 are approximated by a normal distribution N ($\mu$, $\sigma^2$), $\mu$ and $\sigma$ are fitting parameters in the order-statistics model 816 and can be approximated by linear regression based on the obtained relevance scores of search results in the irrelevant search results set 804. The details are described below with respect to FIG. 11.

The relevance score estimator 812 in this embodiment calculates estimated relevance scores 818 of the search results in the possibly relevant search results set 806 based on the order-statistics model 816 and the position information p, n of the search results in the possibly relevant search results set 806. The estimation is based on the assumption that the relevance scores of the search results in the possibly relevant search results set 806 are approximated by the same distribution as the irrelevant search results set 804. The comparator 814 in this embodiment is responsible for comparing the difference between the estimated relevance scores 818 and the actual relevance scores of the possibly relevant search results set 806. Several distance metrics may be used by the comparator 814 to indicate the difference. For example, the distance metrics include the sum of positive errors or the slope (as computed using linear regression) of the error versus the normalized positions. In this embodiment, the larger the distance is, the higher the vertical search quality is predicted for a vertical. The large distance indicates that the irrelevance assumption derived from the irrelevant search results set 804 shall be rejected and not applied to the possibly relevant search results set 806. The distance metrics for each vertical may be used by the vertical ranking module 116 to rank the vertical 108-1, 108-2, . . . 108-*n* for their predicted performance.

Figure 10:
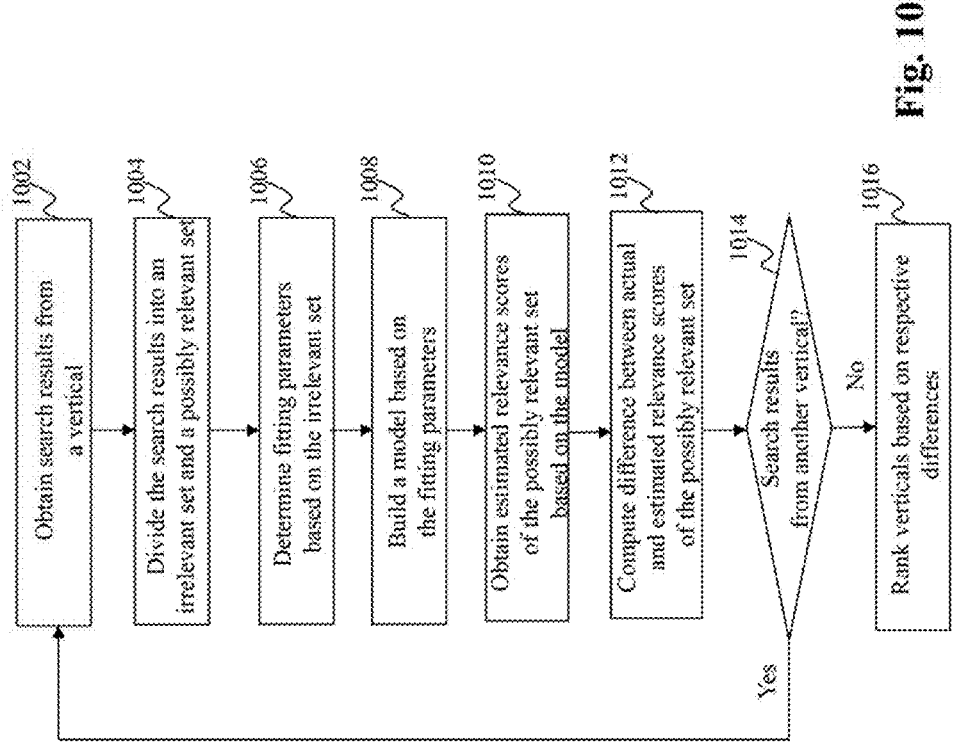
FIG. 10 is a flowchart of an exemplary process for vertical ranking based on order statistics-based normalization of relevance scores, according to an embodiment of the present teaching.

FIG. 10 is a flowchart of an exemplary process for vertical ranking based on order statistics-based normalization of relevance scores, according to an embodiment of the present teaching. Starting at 1002, a plurality of search results n are obtained from the first selected vertical in response to a search query. Ira one example, all content items with non-zero relevance scores are retrieved as n search results from the content corpus of the vertical. The n search results are ranked based on their relevance scores. At 1004, at least some of the search results that are on top of the ranking (top k search results) are divided into an irrelevant set (search results from position r+1 to k in the ranking) and a possibly relevant set (search results from position 0 to k in the ranking). At 1006, one or more fitting parameters are determined based on the relevance scores of the irrelevant set (r<p<k). At 1008, the fitting parameter(s) are used to build an order-statistics model. The order-statistic model may be derived based on the CDF of a distribution by which the relevance scores of the irrelevant set are assumed to be approximated. At 1010, estimated relevance scores of the possibly relevant set are obtained based on the order-statistics model. At 1012, the difference between the actual and estimated relevance scores of the possibly relevant set is computed for the first selected vertical. At 1014, the process checks whether there is another vertical selected for vertical search. If the answer is "yes," the process is repeated from 1002, where n search results from the second selected vertical are obtained, and all the way goes to 1012 until all the selected verticals have been processed. At 1016, the differences for each selected vertical are used for ranking the verticals. In this embodiment, the larger the difference is the higher the ranking of the vertical is.

Figure 11:
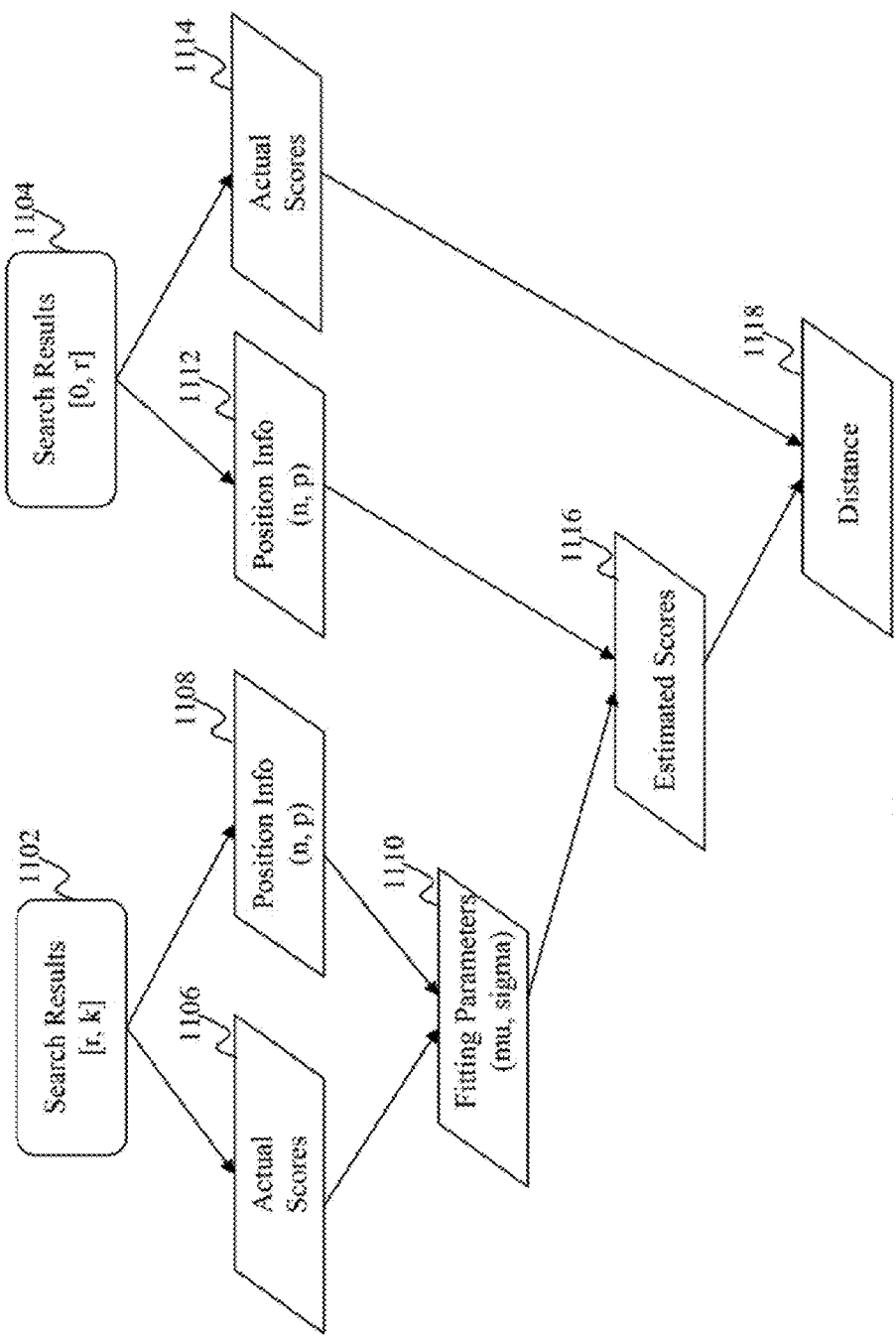
FIG. 11 depicts an exemplary algorithm of order statistics-based normalization of relevance scores using normal distribution cumulative distribution function (CDF), according to an embodiment of the present teaching.

FIG. 11 depicts an exemplary algorithm of order statistics-based normalization of relevance scores using normal distribution CDF, according to an embodiment of the present teaching. In this embodiment, n search results matching the search query (e.g., with a non-zero relevance score) are retrieved from a vertical. The top k of the a search results are considered, including the search results [r, k] 1102 in the irrelevant set and the search results [0, r] 1104 in the possibly relevant set. In this embodiment, it is assumed that the distribution of relevance scores given by a typical search engine can be approximated by a mixture of normal distribution for irrelevant search results, and a gamma distribution for relevant search results. In other words, relevance scores of search results [r, k] 1102 in the irrelevant set are approximated by a normal distribution N ($\mu$, $\sigma^2$). Therefore, the CDF of the scoring function S(d/q) can be approximated by:

$$F(x) \sim = 1/(1+\exp(-1.702(x-\mu)/\sigma)) \quad (4)$$

The following, order-statistics model can thus be derived based on Equations (3) and (4):

$$E[S\_\{p:n\}]=F\char`\^\{-1\}((n-p)/(n+1))=\mu+\sigma/1.02*\ln(n-p)/(p+1)) \quad (5)$$

Accordingly, E[S_{p:n}] is a linear function of the normalized positions ln((n−p)/(p+1)). Therefore, the fitting parameters ($\mu$, $\sigma$) 1110 can be approximated by linear regression based on the actual relevance scores 1106 of search results [r, k] 1102 in the irrelevant set that are approximated by the normal distribution N ($\mu$, $\sigma^2$). The normalized positions ln((n−p/(p+1)) are calculated for each relevance score 1106 based on the position information (n, p) 1108. For example, relevance scores 1106 S_{p:n}D|q) (r<p<k) are used to derive pairs (S_{p:n}(D|q), ln((n−p)/(n+1)/1.702). Fitting parameters ($\mu$, $\sigma$) 1110 are thus calculated from those pairs using linear regression.

With the calculated fitting parameters ($\mu$, $\sigma$) 1110, the order-statistics model in Equation (5) is used for calculating estimated relevance scores 1116 of the search results [0, r] 1104 in the possibly relevant set based on the position information (n, p) 1112 of each search result [0, r] 1104. The distance 1118 of the estimated relevance scores 1116 from the actual relevance scores 1114 of the search results [0, r] 1104 in the possibly relevant set is measured. For example, the sum of positive errors or the slope (as computed using linear regression) of the error versus the normalized positions ln(n−p)/(N+1)) may be used as distance metrics for predicting the vertical search results quality of the vertical.

Figure 12:
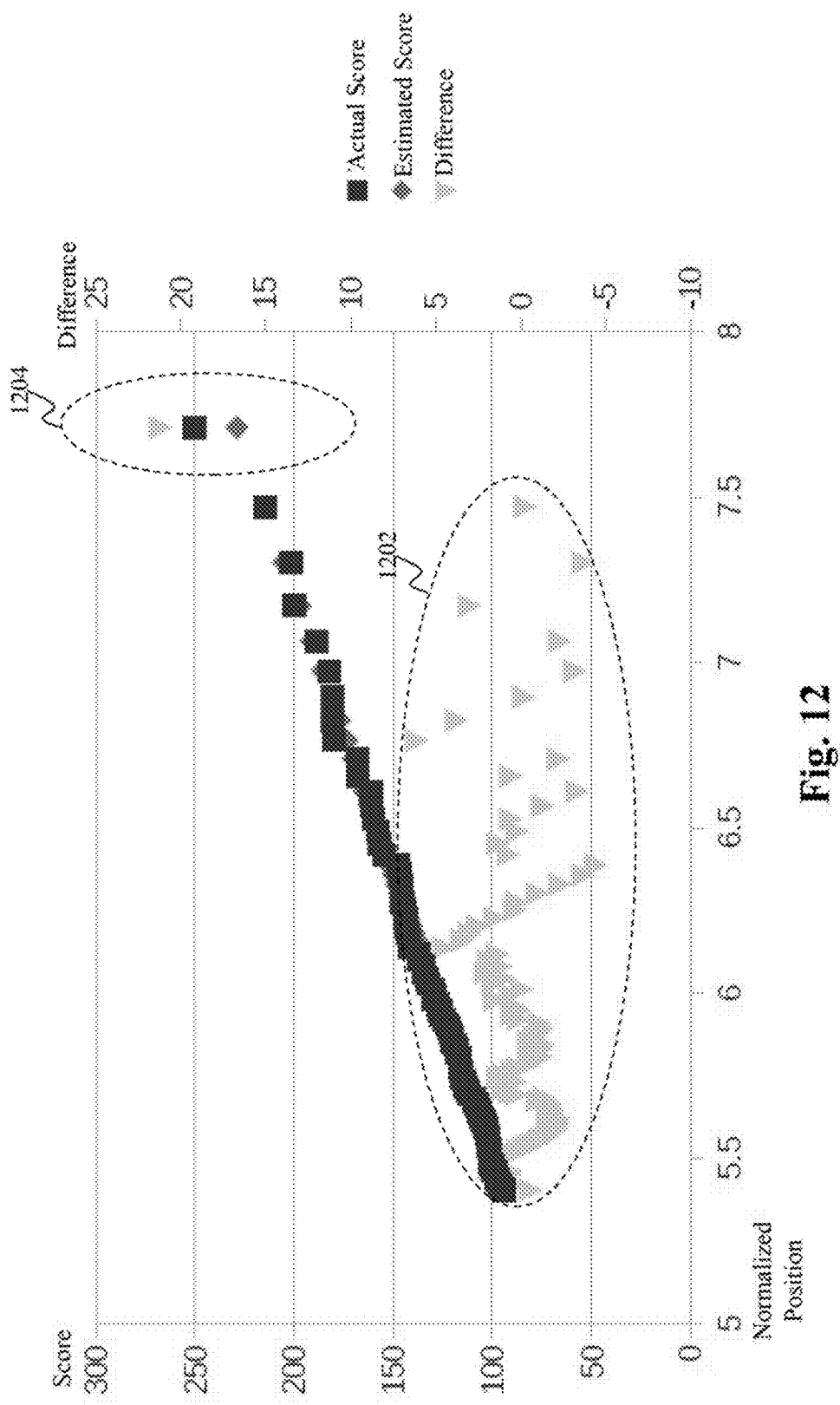
FIG. 12 depicts an exemplary plot of order statistics-based normalization of relevance scores for a query.
Figure 13:
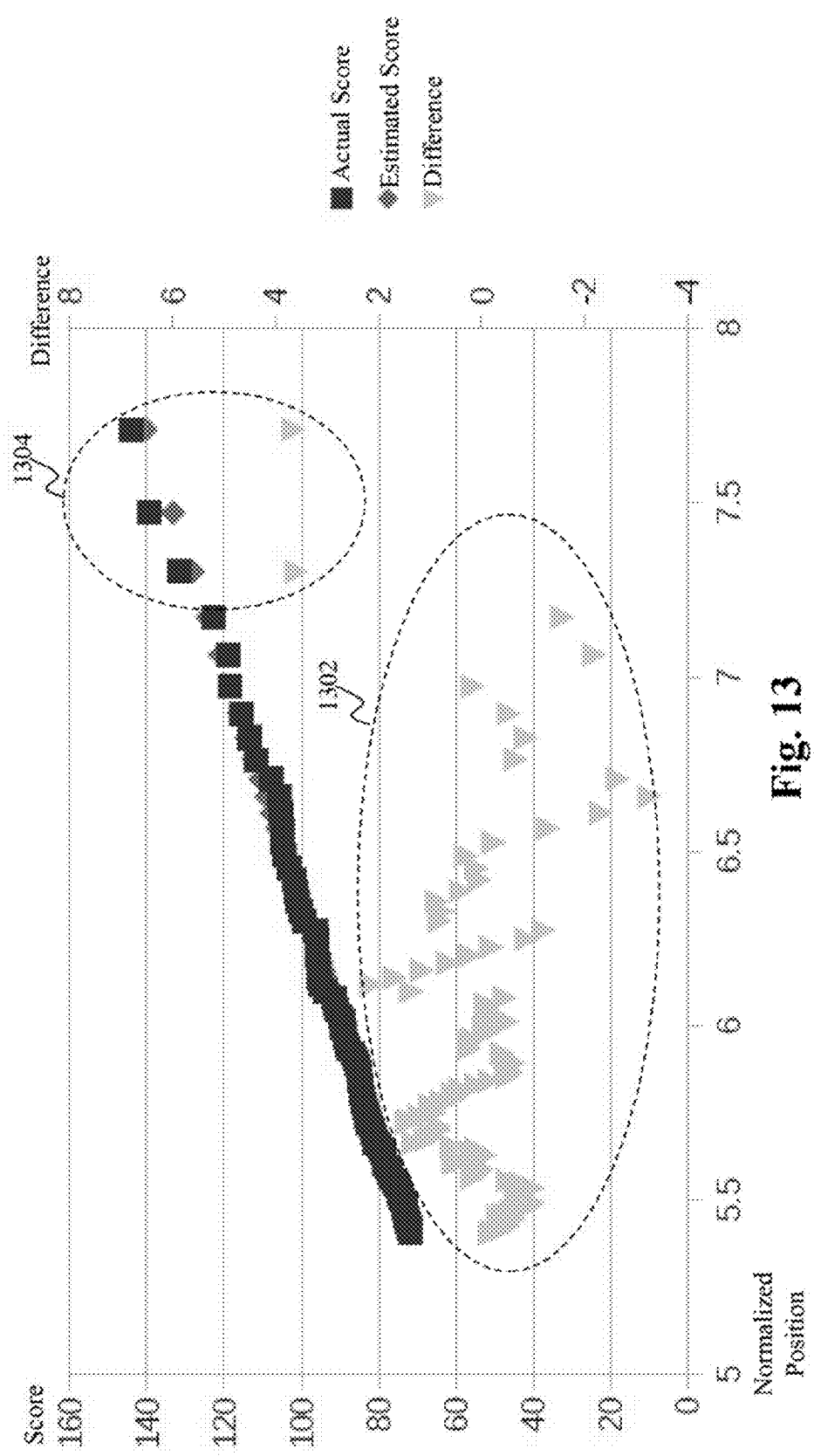
FIG. 13 depicts an exemplary plot of order statistics-based normalization of relevance scores for another query.

FIGS. 12 and 13 depict exemplary plots of order statistics-based normalization of relevance scores for two different queries, respectively. The x-axis represents the normalized positions of each relevance score in the ranking. In FIGS. 12 and 13, the normalized position 8 corresponds to the highest position U in the ranking. The y-axis on the left represents the values of the relevance scores, and the y-axis on the right represents the values of difference between the estimated and actual relevance scores of search results. The differences are obtained using the algorithm descried above with respect to FIG. 11. As shown in FIG. 12, the differences 1202 between estimated and actual relevance scores from the normalized position 7.5 to the normalized position 5.5 are evenly distributed around 0 in a small interval. This indicates that the order-statics model fits the irrelevant search results well under the assumption that these relevance scores are random and approximated by a normal distribution. On the other hand, the difference 1204 is much higher in the highest normalized position, which indicates that the most relevant search results cannot be approximated by the normal distribution as assumed. In FIG. 13, the differences 1302 between estimated and actual relevance scores from the normalized position 7.2 to the normalized position 5.5 are evenly distributed around 0 in a small interval. This indicates that the order-statics model fits the irrelevant search results well under the assumption that these relevance scores are random and approximated by a normal distribution. On the other hand, the differences 1304 are much higher in the top-3 normalized positions, which indicates that the three most relevant search results cannot be approximated by the normal distribution as assumed.

Figure 14:
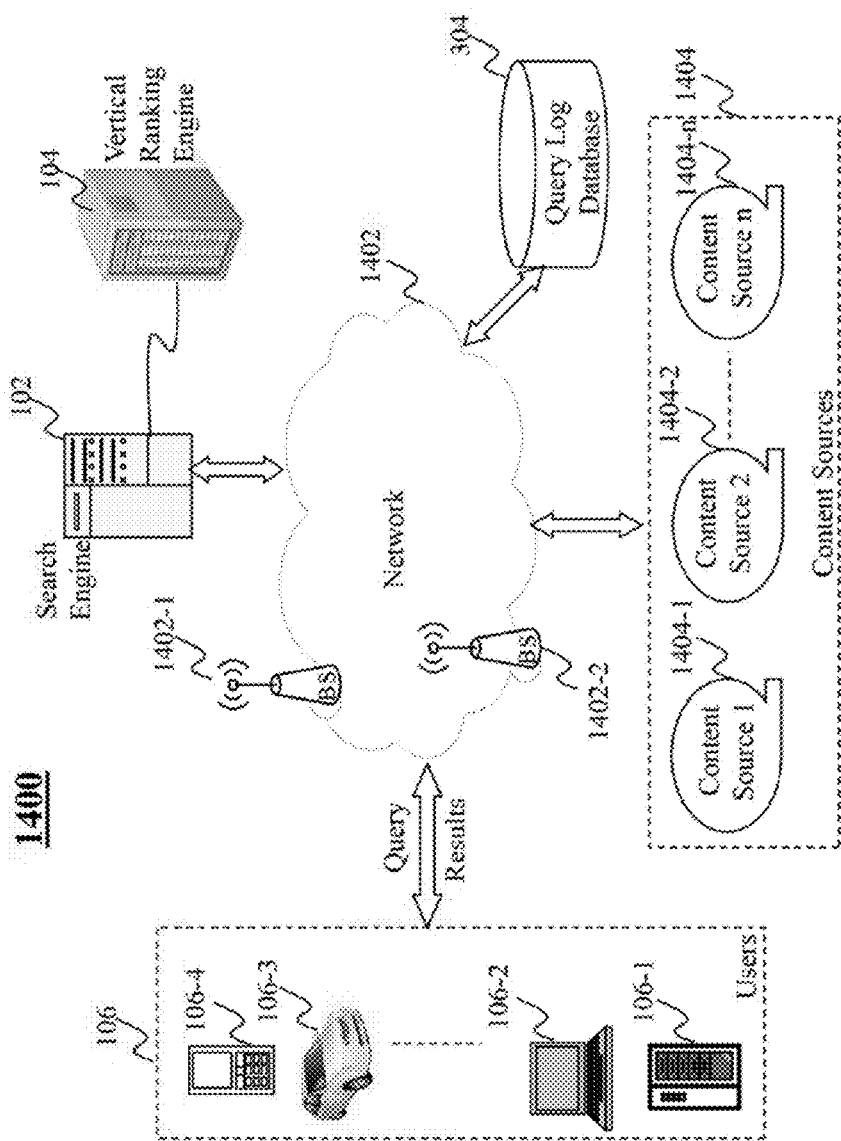
FIG. 14 is a high level exemplary networked environment in which vertical ranking, in vertical search is applied, according to an embodiment of the present teaching.

FIG. 14 depicts an exemplary embodiment of a networked environment in which vertical ranking in vertical search is applied, according to an embodiment of the present teaching. In FIG. 14, the exemplary networked environment 1400 includes the search engine 102, the vertical ranking engine 104, one or more users 106, a network 1402, content sources 1404, and the query log database 304. The network 1402 may be a single network or a combination of different networks. For example, the network 1402 may be a local area network (LAN), a wide area network (WAN), a public network, a private network, a proprietary network, a Public Telephone Switched Network (PSTN), the Internet, a wireless network, a virtual network, or any combination thereof. The network 1402 may also include various network access points, e.g., wired or wireless access points such as base stations or Internet exchange points 1402-1, . . . , 1402-2, through which a data source may connect to the network 1402 in order to transmit information via the network 1402.

Users 106 may be of different types such as users connected to the network 1402 via desktop computers 106-1, laptop computers 106-2, a built-in device in a motor vehicle 106-3, or a mobile device 106-4. A user 106 may send a search query to the search engine 102 via the network 1402 and receive query results from the search engine 102. At least some of the search results are retrieved from vertical(s) selected by the vertical ranking engine 104 based on predicted vertical search results quality of different verticals. In this embodiment, as described in detail above, the vertical ranking engine 104 serves as a backend system for post-retrieval ranking of verticals based on normalized relevance scores of the same query when it applies to the different verticals. In addition, in some embodiments, the search engine 102 may access sample queries, via the network 1402, stored in the query log database 304 for sample-based normalization. The information in the query log database 304 may be generated by one or more different applications (not, shown), which may be running on the search engine 102, at the backend of the search engine 102, or as a completely standalone system capable of connecting to the network 1402, accessing information from different sources, analyzing the information, generating structured information, and storing such generated information in the query log database 304.

The content sources 1404 include multiple content sources 1404-1, 1404-2, . . . , 1404-3, such as vertical content sources (e.g., shopping, local, news, finance, etc.). A content source may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 102 and the vertical ranking engine 104 may retrieve information from any of the content sources 1404-1, 1404-2, . . . , 1404-3.

Figure 15:
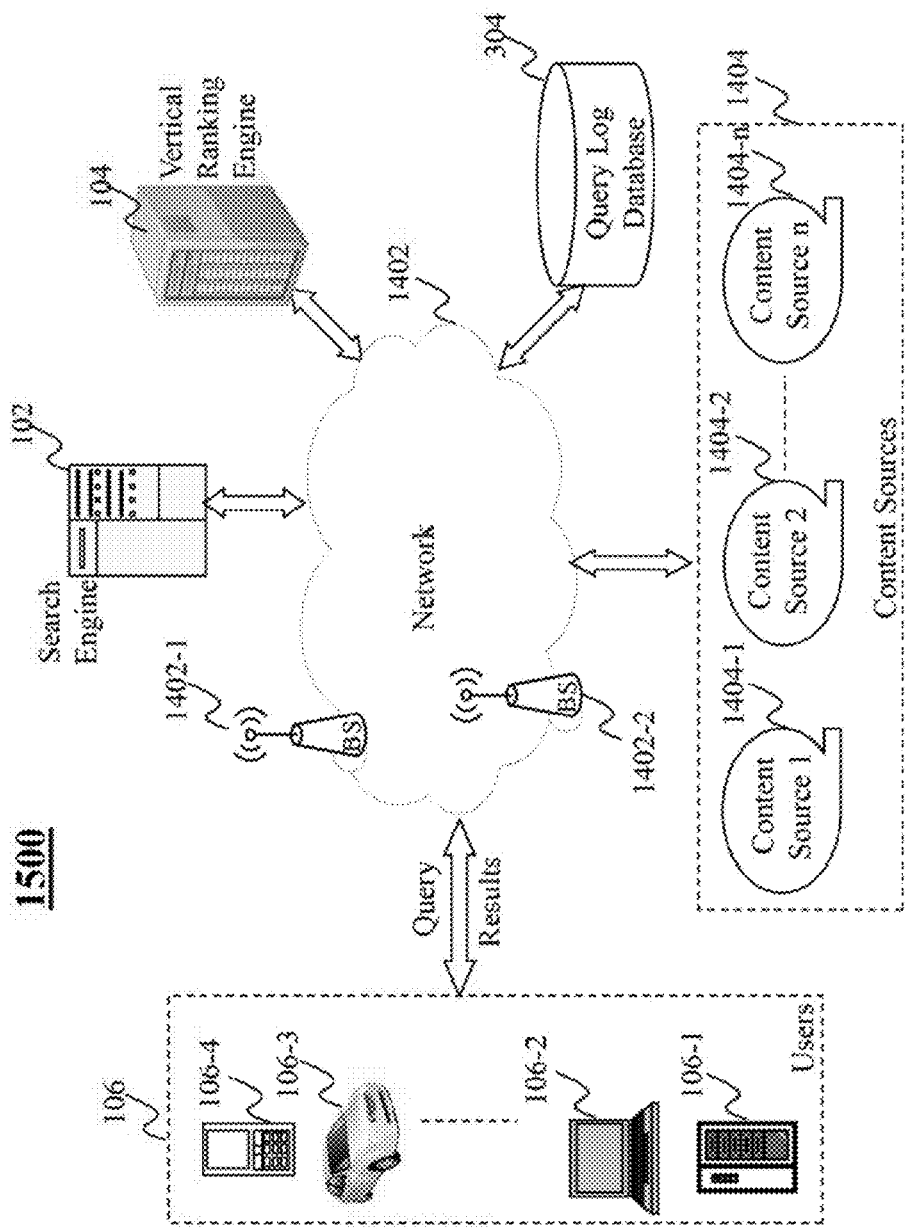
FIG. 15 is another high level exemplary networked environment in which vertical ranking in vertical search is applied, according to an embodiment of the present teaching.

FIG. 15 is a high level depiction of another exemplary networked environment 1500 in which vertical ranking in vertical search is applied, according to an embodiment of the present teaching. The networked environment 1500 in this embodiment is similar to t re networked environment 1400 in FIG. 14, except that the vertical ranking engine 104 in this embodiment acts as an independent service provider that directly connects to the network 1402. For example, an independent service provider with the vertical ranking engine 104 may serve multiple search engines via the network 1402.

Figure 16:
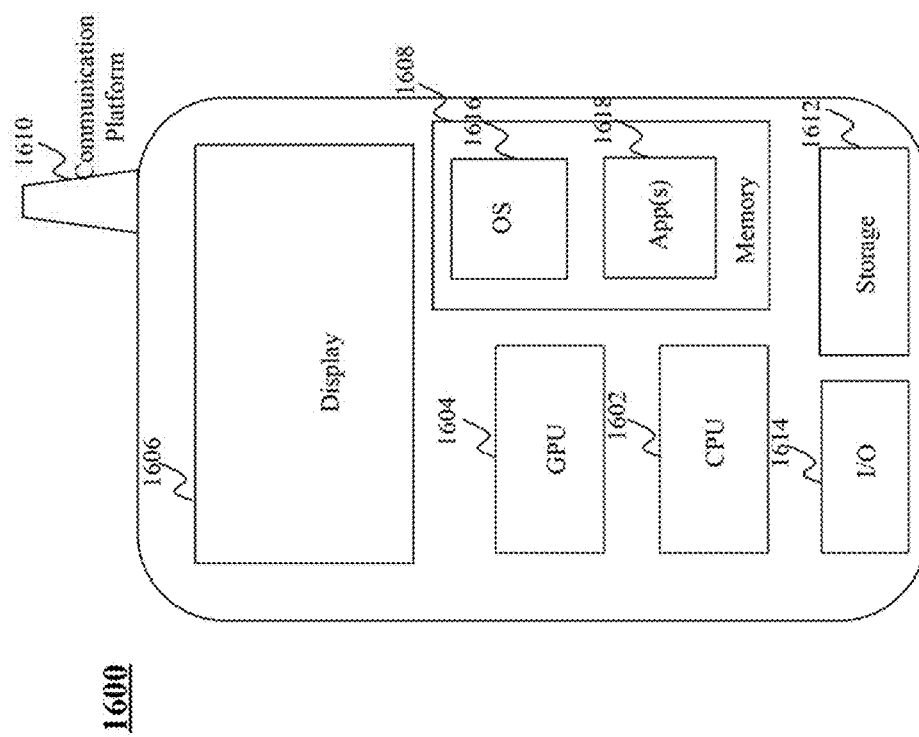
FIG. 16 depicts a general mobile device architecture on which the present teaching can be implemented.

FIG. 16 depicts a general mobile device architecture on which the present teaching can be implemented. In this example, the user device is a mobile device 1600, including but is not limited to, a smart phone, a tablet, a music player, a handled gaming console, a global positioning system (GPS) receiver. The mobile device 1600 in this example includes one or more central processing units (CPUs) 1602, one or more graphic processing units (GPUs) 1604, a display 1606, a memory 1608, a communication platform 1610, such as a wireless communication module, storage 1612, and one or more input/output (I/O) devices 1614. Any other suitable component, such as but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a browser or any other suitable mobile apps for sending search query and rendering vertical search results through the mobile device 1600. Execution of the applications 1618 may cause the mobile device 1600 to perform the processing as described above. For example, the display of vertical search results to the user may be made by the GPU 1604 in conjunction with the display 1606. Search query may be by the user via the I/O devices 1614 and transmitted to the search engine 102 via the communication platform 1610.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
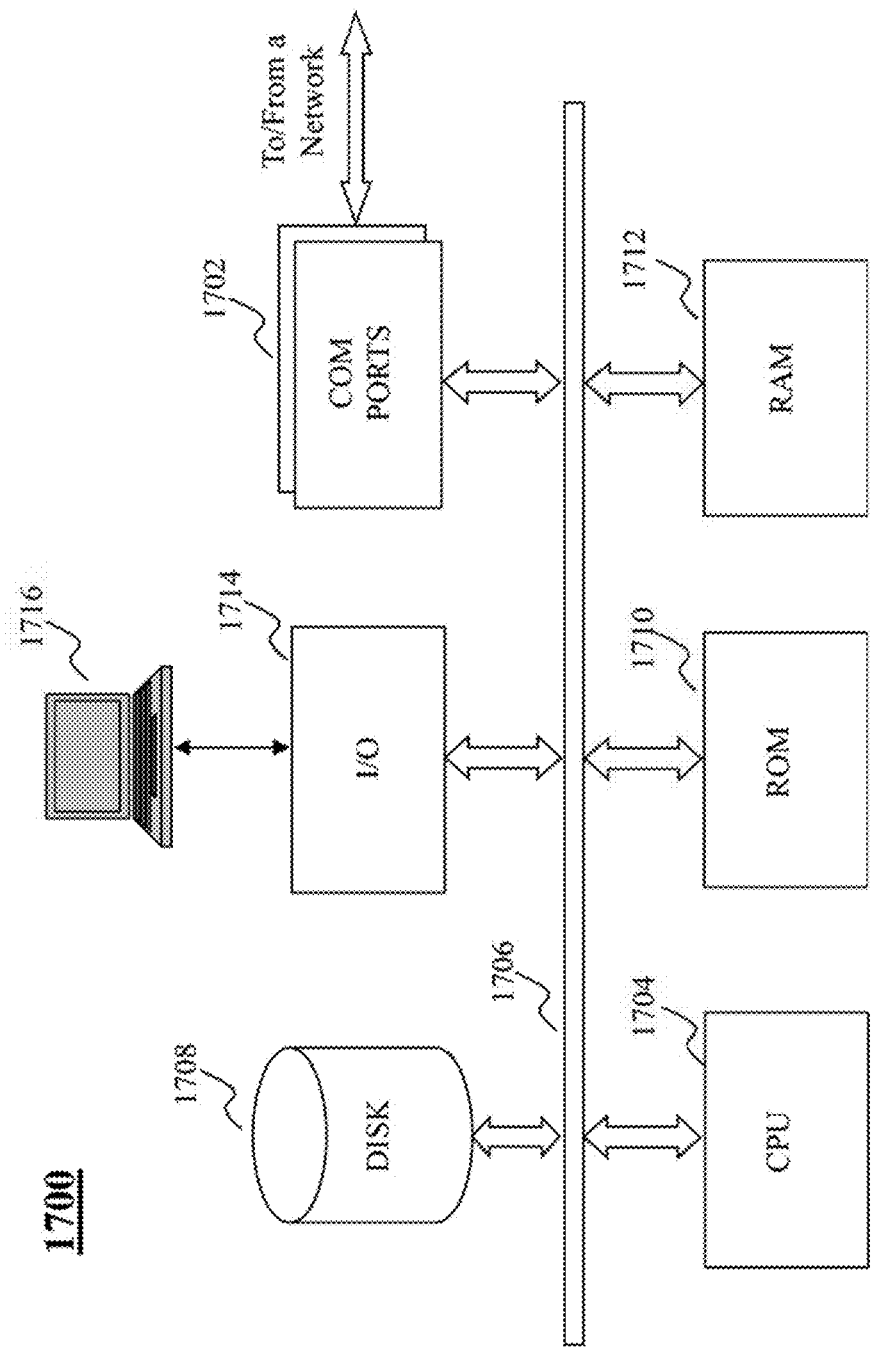
FIG. 17 depicts a general computer architecture on which the present teaching can be implemented.

FIG. 17 depicts a general computer architecture on which the present teaching can be implemented and has a functional block diagram illustration of a computer hardware platform that includes user interface elements. The computer may be a general-purpose computer or a special purpose computer. This computer 1700 can be used to implement any components of the vertical search architecture as described herein. Different components of the systems disclosed in the present teaching can all be implemented on one or more computers such as computer 1700, via its hardware, software program, firmware, or a combination thereof. Although only one such computer is shown, for convenience, the computer functions relating to search suggestion may be implemented in a distributed fashion on a number of similar platforms, to distribute the processing load.

The computer 1700, for example, includes COM ports 1702 connected to and from a network connected thereto to facilitate data communications. The computer 1700 also includes a CPU 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU 1704. The computer 1700 also includes an I/O component 1714, supporting input/output flows between the computer and other components therein such as user interface elements 1716. The computer 1700 may also receive programming and data via network communications.

Hence, aspects of the methods of search results quality prediction, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that ma bear the software elements includes optical, electrical, electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RE) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming, code and/or data. Many of these forms of computer readable media may be involved in carrying one or more sequences of one or more instructions to a processor for execution.

Those skilled in the art will recognize that the present teachings are amenable to a variety of modifications and/or enhancement. For example, although the implementation of various components described above may be embodied in a hardware device, it can also be implemented as a software only solution—e.g., an installation on an existing server. In addition, the units of the host and the client nodes as disclosed, herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which has at least one processor, storage, and a communication platform connected to a network for predicting search results quality, the method comprising the steps of:
    receiving, via the at least one processor, a search query from a user;
    obtaining, via the at least one processor, a plurality of search results from each of a plurality of content sources based on the search query, wherein the plurality of search results from each content source is ranked based on their relevance scores with respect to the search query;
    normalizing, via the at least one processor, a distribution of the relevance scores of the plurality of search results for each of the plurality of content sources in each position of the ranking by building an order-statistic model based on a first set of the plurality of search results from the each content source and by generating estimated relevance scores of a second set of the plurality of search results from the each content source based on the order-statistic model, wherein the first set is different from the second set;
    computing, via the at least one processor, a metric for each of the plurality of content sources based on the normalized distribution of the relevance scores, wherein the metric indicates a relevance between the respective plurality of search results from the content source and the search query;
    ranking, via the at least one processor, the plurality of content sources based on the metrics associated with the plurality of content sources;
    identifying, via the at least one processor, one or more search results from at least one content source that has a higher ranking; and
    providing, via the at least one processor, the one or more search results to the user as a response to the search query.

2. The method of claim 1, wherein computing a metric includes:
    comparing the relevance scores of the respective plurality of search results in the second set with the estimated relevance scores of the second set.

3. The method of claim 1, wherein the plurality of content sources are vertical content sources and/or respond to vertical searches.

4. The method of claim 1, wherein the order-statistic model is built based on the relevance scores of the first set and the positions of the first set in the ranking.

5. The method of claim 1, wherein the estimated relevance scores of the second set is generated based on the positions of the second set in the ranking.

6. The method of claim 1, wherein the relevance scores of the first set is approximated by a normal distribution.

7. The method of claim 1, wherein content of a particular topic, media type, or genre are provided in the plurality of search results from a respective content source.

8. A system for predicting search results quality, the system comprising:
at least one processor configured by machine-readable instructions to:
receive a search query from a user;
obtain a plurality of search results from each of a plurality of content sources based on the search query, wherein the plurality of search results from each content source is ranked based on their relevance scores with respect to the search query;
normalize a distribution of the relevance scores of the plurality of search results for each of the plurality of content sources in each position of the ranking by building an order-statistic model based on a first set of the plurality of search results from the each content source and by generating estimated relevance scores of a second set of the plurality of search results from the each content source based on the order-statistic model, wherein the first set is different from the second set;
compute a metric for each of the plurality of content sources based on the normalized distribution of the relevance scores, wherein the metric indicates a relevance between the respective plurality of search results from the content source and the search query,
rank the plurality of content sources based on the metrics associated with the plurality of content sources,
identify one or more search results from at least one content source that has a higher ranking, and
provide the one or more search results to the user as a response to the search query.

9. The system of claim 8, wherein the at least one processor is further configured to compare the relevance scores of the respective plurality of search results in the second set with the estimated relevance scores of the second set.

10. The system of claim 8, wherein the plurality of content sources are vertical content sources and/or respond to vertical searches.

11. The system of claim 8, wherein the order-statistic model is built based on the relevance scores of the first set and the positions of the first set in the ranking.

12. The system of claim 8, wherein the estimated relevance scores of the second set is generated based on the positions of the second set in the ranking.

13. The system of claim 8, wherein the relevance scores of the first set is approximated by a normal distribution.

14. A non-transitory machine-readable medium having information recorded thereon for predicting search results quality, wherein the information when read by at least one processor, causes the at least one processor to perform the following:
receiving a search query from a user;
obtaining a plurality of search results from each of a plurality of content sources based on the search query, wherein the plurality of search results from each content source is ranked based on their relevance scores with respect to the search query;
normalizing a distribution of the relevance scores of the plurality of search results for each of the plurality of content sources in each position of the ranking by building an order-statistic model based on a first set of the plurality of search results from the each content source and by generating estimated relevance scores of a second set of the plurality of search results from the each content source based on the order-statistic model, wherein the first set is different from the second set;
computing a metric for each of the plurality of content sources based on the normalized distribution of the relevance scores, wherein the metric indicates a relevance between the respective plurality of search results from the content source and the search query;
ranking the plurality of content sources based on the metrics associated with the plurality of content sources;
identifying one or more search results from at least one content source that has a higher ranking; and
providing the one or more search results to the user as a response to the search query.

15. A method, implemented on at least one machine each of which has at least one processor, storage, and a communication platform connected to a network for predicting search results quality, the method comprising the steps of:
receiving, via the at least one processor, a search query from a user;
obtaining, via the at least one processor, a plurality of search results from each of a plurality of content sources based on the search query, wherein the plurality of search results from each content source is ranked based on their relevance scores with respect to the search query;
normalizing, via the at least one processor, a distribution of the relevance scores of the plurality of search results for each of the plurality of content sources in each position of the ranking by computing, in the each position, a normalized relevance score of the respective search result based on a mean and a standard deviation of relevance scores in the position that are obtained by obtaining a plurality of sample query results from the plurality of content sources based on each of a plurality of sample queries, each of the sample query results being ranked in the position, and by computing the mean and the standard deviation of the plurality of sample queries results in the position;
computing, via the at least one processor, a metric for each of the plurality of content sources based on the normalized distribution of the relevance scores, wherein the metric indicates a relevance between the respective plurality of search results from the content source and the search query;
ranking, via the at least one processor, the plurality of content sources based on the metrics associated with the plurality of content sources;
identifying, via the at least one processor, one or more search results from at least one content source that has a higher ranking; and
providing, via the at least one processor, the one or more search results to the user as a response to the search query.

* * * * *